US010626249B2

(12) United States Patent
Hadimani et al.

(10) Patent No.: US 10,626,249 B2
(45) Date of Patent: Apr. 21, 2020

(54) POLYOLEFIN COMPOSITIONS

(71) Applicant: SABIC GLOBAL TECHNOLOGIES B.V., Bergen op Zoom (NL)

(72) Inventors: Imam Khasim Hadimani, Riyadh (SA); Ahmad Abdullah Alshaiban, Riyadh (SA); Abdulrahman Al-Beladi, Riyadh (SA); Abderrahman Meddad, Riyadh (SA); Musaad Al-Sadhan, Riyadh (SA); Saad Nasser Al-Hussain, Houston, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 26 days.

(21) Appl. No.: 15/757,665

(22) PCT Filed: Sep. 2, 2016

(86) PCT No.: PCT/EP2016/070681
§ 371 (c)(1),
(2) Date: Mar. 6, 2018

(87) PCT Pub. No.: WO2017/042092
PCT Pub. Date: Mar. 16, 2017

(65) Prior Publication Data
US 2019/0023870 A1    Jan. 24, 2019

(30) Foreign Application Priority Data
Sep. 9, 2015 (EP) .................................... 15184371

(51) Int. Cl.
| C08K 5/1545 | (2006.01) |
| C08L 23/10 | (2006.01) |
| C08F 210/06 | (2006.01) |
| C08K 5/159 | (2006.01) |
| B29C 45/26 | (2006.01) |
| B29K 23/00 | (2006.01) |

(52) U.S. Cl.
CPC .......... *C08K 5/1545* (2013.01); *C08F 210/06* (2013.01); *C08K 5/159* (2013.01); *C08L 23/10* (2013.01); *B29C 45/26* (2013.01); *B29K 2023/14* (2013.01)

(58) Field of Classification Search
None
See application file for complete search history.

(56) References Cited

U.S. PATENT DOCUMENTS

| 4,399,054 A | 8/1983 | Ferraris et al. |
| 4,463,113 A | 7/1984 | Nakahara et al. |
| 4,472,524 A | 9/1984 | Albizzati |
| 5,049,605 A | 9/1991 | Rekers |
| 5,342,868 A | 8/1994 | Kimura et al. |
| 6,465,551 B1 | 10/2002 | Zhao et al. |
| 6,534,574 B1 | 3/2003 | Zhao et al. |
| 8,785,529 B2 | 7/2014 | Rao et al. |
| 9,181,424 B2 * | 11/2015 | Biondini ................ C08L 23/14 |
| 9,650,465 B2 * | 5/2017 | Roegiers ................ C08F 10/06 |
| 2004/0220311 A1 | 11/2004 | Dotson et al. |
| 2006/0100324 A1* | 5/2006 | Horie .................... C08K 5/1575 |
| | | 524/108 |
| 2006/0270766 A1 | 11/2006 | Xu et al. |
| 2013/0032756 A1* | 2/2013 | Kimura ................ C08K 5/134 |
| | | 252/182.14 |

FOREIGN PATENT DOCUMENTS

| CN | 104610682 A * | 5/2015 |
| EP | 0940431 A1 | 9/1999 |
| EP | 1379368 B1 | 12/2006 |
| WO | 2004072168 A2 | 8/2004 |
| WO | 2005063870 A1 | 7/2005 |
| WO | 2006010414 A1 | 2/2006 |
| WO | 2006071721 A1 | 7/2006 |

OTHER PUBLICATIONS

CN-104610682-A, May 2015, Derwent AB.*
Gronwald et al., "Further evidence for the gelation ability-structure correlation in sugar-based gelators," Carbohydrate Research 331 (2001) 307-318.
Hamdan et al., "Compatibility Studies of Polypropylene (PP)-Sago Starch (SS) Blends using DMTA," Journal of Polymer Research vol. 7, No. 4, 237-244, Dec. 2000.
International Search Report for International Application No. PCT/EP2016/070681; International Filing Date: Sep. 2, 2016; dated Oct. 25, 2016; 2 Pages.
Libster et al., "Advanced Nucleating Agents for Polypropylene," Polym. Adv. Technol. 2007, 18: 685-695.
Peacock, Andrew J., "Handbook of Polyethylene", Chapter 3 Production Processes, 2000, Marcel Dekker, Inc., New York; ISBN 0824795466; p. 43-66.
Written Opinion of the International Searching Authority for International Application No. PCT/EP2016/070681; International Filing Date: Sep. 2, 2016; dated Oct. 25, 2016; 4 Pages.
Zimm et al., "The Dimensions of Chain Molecules Containing Branches and Rings," The Journal of Chemical Physics, vol. 17, No. 12 (Dec. 1949) pp. 1301-1314.

* cited by examiner

*Primary Examiner* — Satya B Sastri
(74) *Attorney, Agent, or Firm* — Cantor Colburn LLP

(57) ABSTRACT

The invention relates to a composition comprising A) polyolefin and B) one or more compounds selected from the group of galactopyranoside derivatives, galactopyranose derivatives, mannopyranoside derivatives, mannopyranose derivatives, mannofuranoside derivatives and mannofuranose derivatives, wherein the amount of component B) is from 0.25 to 5 wt % based on the total composition. The invention relates to use of the composition in injection molding.

17 Claims, No Drawings

POLYOLEFIN COMPOSITIONS

CROSS REFERENCE TO RELATED APPLICATIONS

This application is a 371 of International Application No. PCT/EP2016/070681, filed Sep. 2, 2016, which claims priority to European Application No. 15184371.1 filed Sep. 9, 2015 which are incorporated herein by reference in their entirety.

The invention relates to a polyolefin composition comprising a nucleating agent.

Nucleating agents are chemical compounds or compositions that enable faster nucleation or a higher crystallization temperature of thermoplastic polymers, resulting in productivity gains during their processing and in improved mechanical and physical properties of articles made from such thermoplastics. These compounds provide nucleation sites for crystal growth during cooling of a thermoplastic molten composition. In polypropylenes, for example, a higher degree of crystallinity and more uniform crystalline structure is obtained by adding a nucleating agent such as talc and carboxylate salts, e.g. sodium benzoate. An overview of nucleating agents used in polypropylene-based compositions is given for example in *Polym. Adv. Technol.* 2007, 18, 685-695. However, it is commonly recognized that the use of nucleating agents is a highly unpredictable technology area. Small changes in a molecular structure of the nucleator can drastically alter the ability of a nucleating agent to nucleate effectively a polymer composition. There are still many unknowns regarding the effect of a nucleating agent on polymer morphology during (re-)crystallization of thermoplastics.

A nucleating composition is known from document EP 1379368 B1. This document discloses at least one metal salt of hexahydrophthalic acid (HHPA), e.g. calcium, strontium, lithium and monobasic aluminium salt, to be used as nucleating agent to produce thermoplastic compositions showing improved crystallization behavior.

Several other documents also disclose metal salts employed as nucleating additives for thermoplastics. For example, US 2004/0220311 A1 discloses the use of a specific hexahydrophthalic acid metal salt, e.g. calcium, strontium, lithium, or monobasic aluminium, as nucleating agent in various thermoplastics, particularly in polypropylene compositions. WO 2006/071721 discloses a thermoplastic composition comprising a polyolefin; a nucleating agent comprising a dicarboxylate salt compound, e.g. bicyclic [2.2.1] heptane dicarboxylate salt, available from Milliken & Company under the trade name Hyperform® HPN-68; a first fatty acid salt having a first cationic counter ion selected from the group consisting of calcium, sodium, lithium and barium, e.g. calcium stearate; and a second fatty acid salt having a second cationic counter ion selected from the group of magnesium, aluminium and zinc, e.g. zinc stearate.

Some nucleating agents also act as clarifying agents. Conventionally sorbitols are used as clarifiers in polypropylene for various applications including transparency, thin walled injection moulding, health care segments etc. For example, US2006270766 discloses the use of sorbitol in polypropylene compositions as a nucleating agent. More in particular, US2006270766 discloses a polyolefin composition comprising: A) a polypropylene resin, said polypropylene resin having an MFR value of at least about 20 as measured by ASTM 1238-04; B) a first compound comprising bis(3,4-dimethylbenzylidene)sorbitol; and (c) a second compound comprising dibenzylidene sorbitol. The first compound and the second compound acting as nucleating agents led to a good clarity in the article made from the composition.

Known sorbitols require loading at a high level to achieve the required properties, which leads to a high cost and possibly a high haze.

Nonitol-based nucleating agents or clarifiers are also known, but their use also involves a high cost.

There is a demand for a polyolefin composition such as a propylene and polyethylene composition with a high crystallization temperature. A higher crystallization temperature means that the composition will crystallize with less cooling, as compared to a composition with a lower crystallization temperature. In a composition with a higher crystallization temperature, the cooling will go faster and hence release from the mold can also be done faster. Hence, shorter cycle times for the preparation of articles can be achieved.

It is an objective of the present invention to provide a polyolefin composition in which the above-mentioned and/or other problems are solved.

Accordingly, the present invention provides a composition comprising A) a polyolefin and B) one or more compounds selected from the group of galactopyranoside derivatives, galactopyranose derivatives, mannopyranoside derivatives, mannopyranose derivatives, mannofuranoside derivatives and mannofuranose derivatives,
wherein the amount of component B) is from 0.25 to 5 wt % based on the total composition.

It has surprisingly been found that the use of component B) in a polyolefin composition leads to a higher crystallization temperature. A low amount of component B) is sufficient for achieving a large increase in the crystallization temperature.

Although not wishing to be bound by any theory, it is believed that the large nucleating effect of component B) is due to its high solubility in the polyolefin.

Nucleus density, which determines nucleating effect, is related to the amount of dissolved nucleating agent in the polyolefin matrix. Known sorbitol based clarifiers/nucleating agents are polar compounds, which cannot dissolve in the propylene-based polymer in large quantities. In contrast, component B) is a low molecular weight organogelator, which means that they are super gelators having a high solubility in polyolefin. These super gelators transform into nanofibrous structure upon cooling. O. Gronwald et al.: *Carbohydrate Research* 331 (2001) 307-318 describes this gelation ability. It is believed that this induces epitaxial nucleation on the matrix.

Further, the melting temperature of component B) is believed to positively influence its nucleating effect. Processing polyolefin such as propylene-based polymer at very high temperatures leads to degradation and chain scission of the resin thereby decreasing the mechanical performance and aesthetic values of the resin. Hence, there is an upper limit to the processing temperature of polyolefin. In contrast, the melting temperatures of most of the commercial benzylidene sorbitols are in the range of 250-275° C., which is higher than the typical upper limit of the processing temperature of polyolefins. This results in decrease in solubility of these types of clarifiers in the polyolefin at its processing temperature. In contrast, component B) has a melting temperature which is within the range of the processing temperatures of the polyolefin such as propylene and polyethylene.

It is believed that component B) has an excellent nucleating effect due to the fact that its nucleus density is high for the above-described reasons.

Furthermore, since component B) is a compound which does not result in harmful degradation products, the composition according to the invention can be used in medical and food grade applications. Unlike some of the inorganic metal salts nucleating agents, the degradation products of component B) are compatible with medical and food regulations such as the U.S. Food and Drug Administration (FDA) regulations for food contact applications.

Component A)

Preferably, the polyolefin is an ethylene-based polymer or a propylene-based polymer. The polyolefin may also be a combination of the ethylene-based polymer and the propylene-based polymer.

Preferably, the amount of the polyolefin in the composition of the invention is at least 80 wt %, for example at least 85 wt %, for example at least 90 wt %, for example at least 95 wt %, for example at least 97 wt %, for example at least 98 wt % based on the total composition.

Ethylene-Based Polymer

With ethylene-based polymer as used herein is meant an ethylene homopolymer or an ethylene copolymer. Various types of polyethylene are known, for example linear low density polyethylene (LLDPE), low density polyethylene (LDPE) and high density polyethylene (HDPE). The production processes of LDPE, HDPE and LLDPE are well known and summarised in Handbook of Polyethylene by Andrew Peacock (2000; Dekker; ISBN 0824795466) at pages 43-66.

Suitable comonomers in the ethylene copolymer include C3-C10 α-olefin including 1-butene, 1-hexene, 4-methyl pentene and 1-octene. The preferred comonomer is 1-hexene. The α-olefin co monomer may be present in an amount of about 5 to about 20 percent by weight of the ethylene-α olefin copolymer, more preferably an amount of from about 7 to about 15 percent by weight of the ethylene-α olefin copolymer.

Propylene-Based Polymer

With propylene-based polymer as used herein is meant propylene homopolymer, a random or a block copolymer of at least 70 wt % of propylene with up to 30 wt % of an α-olefin having 2 or 4 to 10 C-atoms or a heterophasic propylene copolymer as described elsewhere in the description.

Propylene Homopolymer and Random or Block Copolymer

The examples of α-olefin in the random or block propylene copolymer include ethylene, 1-butene, 1-pentene, 4-methyl-1-pentene, 1-hexen, 1-heptene or 1-octene, preferably ethylene. The propylene copolymer may consist of at least 70 wt % of propylene and up to 30 wt % of α-olefin, preferably 1-10 wt % of α-olefin, based on the total weight of the propylene copolymer.

Polypropylene homopolymer and the copolymer of propylene with an α-olefin can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Preferably, the propylene-based polymer used in the invention is a propylene homopolymer or a copolymer of propylene with ethylene, wherein the amount of ethylene is 1-10 wt % based on the copolymer.

Preferably, in the composition of the invention, the degree of crystallinity of the propylene homopolymer or the random or block propylene copolymer is at least 30%, for example at least 35%, for example at least 40% and for example at most 80%, for example at most 75% as determined using Differential Scanning calorimetry according to ASTM D 3418-08 using a scan rate of 10° C./min on a sample of 10 mg and using the second heating cycle.

The degree of branching of the propylene homopolymer or the random or block propylene copolymer is preferably low, for example the branching index g' is at least 0.95, preferably at least 0.96, for example at least 0.97, for example at least 0.98, for example at least 0.99, for example 1.00.

The branching index g' defines the degree or branching and correlates with the amount of branches of a polymer. The branching index g' is defined as $g'=[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same average molecular weight (within a range of ±3%) as the branched polypropylene. Thereby, a low g'-value is an indicator for a highly branched polymer. In other words, if the g'-value decreases, the branching of the polypropylene increases. Reference is made in this context to B. H. Zimm and W. H. Stockmeyer, J. Chem. Phys. 17, 1301 (1949). This document is hereby included by reference.

The intrinsic viscosity needed for determining the branching index g' is measured according to DIN ISO 1628/1, October 1999 (in decalin at 135° C.).

Alternatively, the branching of the propylene homopolymer of the random or block propylene copolymer may be measured using $^{13}C$ NMR. Preferably the amount of branching in the polypropylene is low, for example the amount of branching in the polypropylene is in the range from 0 to 10 branches/1000 carbon atoms, for example in the range from 0 to 5 branches/1000 carbon atoms for example in the range from 1 to 5 branches/1000 carbon atoms. Preferably, the melt mass flow rate of the polypropylene as determined using with ISO 1133 (230° C./2.16 kg) ranges from 0.3-100 g/10 min. Preferably, the melt mass flow rate of the polypropylene ranges from 1 to 25 g/10 min, more preferably from 2 to 12 g/10 min.

Preferably, the melt mass flow index (MFI) of the propylene homopolymer of the random or block propylene copolymer as measured in accordance with ISO 1133 using a 2.16 kg weight and at a temperature of 230° C. is in the range of 0.1-120 dg/min, for example at least 0.1 dg/min, at least 0.2 dg/min, at least 0.3 dg/min, at least 0.5 dg/min, at least 1 dg/min, at least 1.5 dg/min, at least 3 dg/min, at least 5 dg/min or at least 10 dg/min, and/or for example at most 120 dg/min, at most 100 dg/min, at most 80 dg/min, at most 60 dg/min, at most 50 dg/min, at most 40 dg/min, at most 30 dg/min, at most 25 dg/min, at most 20 dg/min, at most 15 dg/min or at most 10 dg/min. For injection molding, a relatively high MFI such as 10-40 dg/min is required, unlike e.g. the production of a blown film.

Heterophasic Propylene Copolymer

The polypropylene-based polymer may be a heterophasic propylene copolymer. Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

Heterophasic propylene copolymers are generally prepared in two or more than two reactors in series, by polymerization of propylene (or propylene and α-olefin) in the presence of a catalyst and subsequent polymerization of an ethylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natta catalyst.

The heterophasic propylene copolymer may be prepared by the process comprising polymerizing propylene and optionally α-olefin in the presence of a catalyst system to obtain the propylene-based matrix and subsequently polymerizing ethylene and α-olefin in the propylene-based matrix in the presence of a catalyst system to obtain the dispersed ethylene-α olefin copolymer. These steps are preferably performed in different reactors. The catalyst systems for the first step and for the second step may be different or same.

The heterophasic propylene copolymer consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The heterophasic propylene copolymer consists of
(a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and
wherein the propylene-based matrix is present in an amount of 60 to 95 wt % based on the total heterophasic propylene copolymer and
(b) a dispersed ethylene-α-olefin copolymer,
wherein the dispersed ethylene-α-olefin copolymer is present in an amount of 40 to 5 wt % based on the total heterophasic propylene copolymer and
wherein the sum of the total amount of propylene-based matrix and total amount of the dispersed ethylene-α-olefin copolymer in the heterophasic propylene copolymer is 100 wt %.

The propylene-based matrix consists of a propylene homopolymer and/or a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix.

Preferably, the α-olefin in the propylene-α-olefin copolymer is selected from the group of α-olefins having 2 or 4-10 carbon atoms, for example ethylene, 1-butene, 1-pentene, 4-methyl-1-pentene, 1-hexene, 1-heptene or 1-octene, and is preferably ethylene.

Preferably, the propylene-based matrix consists of a propylene homopolymer.

The propylene-based matrix is present in an amount of 60 to 95 wt %, for example 65 to 85 wt %, for example 70 to 85 wt %, for example 70 to 80 wt %, for example 65 to 75 wt % or 75 to 85 wt % based on the total heterophasic propylene copolymer.

The propylene-based matrix is preferably semi-crystalline, that means it is not 100% amorphous, nor 100% crystalline. For example, the propylene-based matrix is at least 30%, for example at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 5.0 microns, more typically 0.05 to 2.0 microns, as may be determined by transmission electron microscopy (TEM).

The dispersed ethylene-α-olefin copolymer is present in an amount of 40 to 5 wt %. Preferably, the dispersed ethylene-α-olefin copolymer is present in an amount of at least 10 wt %, for example at least 15 wt % or at least 17 wt %, and/or at most 35 wt %, for example at most 30 wt % or 25 wt %, based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt %.

Preferably, the amount of ethylene in the ethylene-α-olefin copolymer is in the range of 20 to 65 wt %, for example in the range of 40 to 60 wt % based on the ethylene-α-olefin copolymer, for example the amount of ethylene in the ethylene-α-olefin copolymer is at least 30 wt % and/or for example at most 55 wt % based on the ethylene-α-olefin copolymer.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

Preferably, the amount of ethylene in the heterophasic propylene copolymer is 3-40 wt %, for example at least 5 wt %, based on the heterophasic propylene copolymer. More preferably, the amount of ethylene in the heterophasic propylene copolymer is at least 6 wt %, more preferably at least 8 wt %.

Preferably, the propylene-based matrix has a melt flow rate (before it is mixed with other components of the composition of the invention; $MFI_{PP}$) of at most 70 dg/min, preferably at most 50 dg/min, preferably at most 30 dg/min, most preferably at most 20 dg/min (ISO 1133, 230° C., 2.16 kg). Preferably, the propylene-based matrix has a melt flow rate of at least 0.1 dg/min, at least 0.5 dg/min, at least 1 dg/min, at least 5 dg/min or at least 10 dg/min (ISO 1133, 230° C., 2.16 kg).

Preferably, the dispersed ethylene α-olefin copolymer has a melt flow rate (before it is mixed with other components of the composition of the invention; $MFI_{EPR}$) of at least 0.001 dg/min, at least 0.01 dg/min, at least 0.1 dg/min, at least 0.3 dg/min, at least 0.7 dg/min, at least 1 dg/min, and/or for example at most 20 dg/min, at most 15 dg/min at most 10 dg/min, at most 5 dg/min or at most 3 dg/min. The MFI of the dispersed ethylene α-olefin copolymer ($MFI_{EPR}$) is calculated taking into account the MFI of the propylene-based matrix ($MFI_{PP}$), the MFI of the heterophasic propylene copolymer (MFIheterophasic) and the amount of the propylene-based matrix in the heterophasic propylene copolymer (matrix content) and the amount of the dispersed phase in the heterophasic propylene copolymer (rubber content (RC)) according to the following formula:

$$MFIEPR = 10^{\wedge}\left(\frac{\text{Log } MFIheterophasic - \text{matrix content} * \text{Log } MFIPP}{\text{rubber context}}\right)$$

Preferably, the heterophasic propylene copolymer has a melt flow rate (MFIheterophasic) of at most 50 dg/min, at most 40 dg/min, at most 30 dg/min, at most 20 dg/min or at most 15 dg/min (ISO 1133, 230° C., 2.16 kg). Preferably, the melt flow rate of the heterophasic propylene copolymer is at least 0.1 dg/min, at least 0.5 dg/min, at least 1 dg/min, at least 5 dg/min or at least 10 dg/min (ISO 1133, 230° C., 2.16 kg).

The values of the MFI of the propylene-based matrix ($MFI_{PP}$) and the MFI of the dispersed ethylene-α-olefin elastomer ($MFI_{EPR}$) mentioned herein are understood as the values before the heterophasic propylene copolymer is mixed with the nucleating agents and optional components to obtain the composition according to the invention. The value of the MFI of the heterophasic propylene copolymer (MFIheterophasic) refers to the final MFI of the heterophasic propylene copolymer. To exemplify this:

In case the heterophasic propylene copolymer is not subjected to vis-breaking or shifting by melt-mixing with a peroxide, the MFIheterophasic is the original WI value of the heterophasic propylene copolymer. In case the heterophasic propylene copolymer is subjected to vis-breaking or shifting by melt-mixing with a peroxide, the MFIheterophasic is the value of the heterophasic propylene copolymer after such vis-breaking or shifting.

It has been recognized that the β-nucleation takes in particular place in the propylene-based matrix (a) than the dispersed phase (b). Thus as a further preferred requirement the propylene-based matrix (a) is more β-crystallised than the dispersed phase (b).

The propylene-based polymer may also be a combination of any of the propylene-based polymer mentioned above, e.g. a mixture of a propylene homopolymer and a heterophasic propylene copolymer at a weight ratio of 1:99-99:1 or 50:50 or a mixture of a propylene homopolymer and a random propylene-ethylene copolymer at a weight ratio of 1:99-99:1 or 50:50.

Component B)

Component B) is selected from the group of galactopyranoside derivatives, galactopyranose derivatives, mannopyranoside derivatives, mannopyranose derivatives, mannofuranoside derivatives and mannofuranose derivatives.

The amount of component B) is from 0.25 to 5 wt % based on the total composition. Preferably, the amount of component B) is at least 0.3 wt %, at least 0.35 wt %, at least 0.40 wt % or at least 0.45 wt %, and/or for example at most 4 wt %, at most 3 wt %, at most 2 wt %, at most 1 wt %, at most 0.75 wt % or at most 0.5 wt %, based on the total composition. Preferably, the amount of component B) is 0.25-0.75 wt % based on the total composition. Such amount results in a good nucleating efficiency without decrease in the haze property.

Suitable examples of galactopyranoside derivatives include:

Methyl 4,6,-O-(4-nitrobenzylidene)-α-D-galactopyranoside

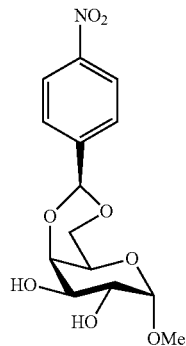

2-Chloro-4-nitrophenyl 2-azido-2-deoxy-β-D-galactopyranoside

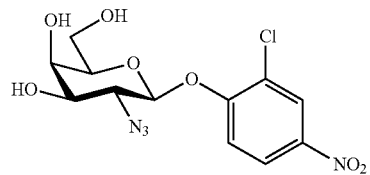

2-Fluoro-4-nitrophenyl 2-azido-2-deoxy-β-D-galactopyranoside

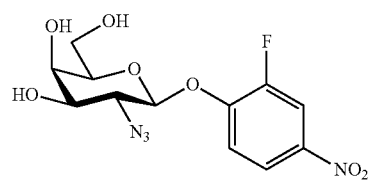

4-Methoxyphenyl 2,3,4,6-tetra-O-acetyl-β-D-galactopyranoside

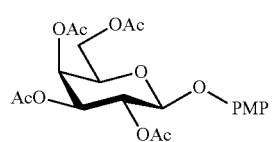

-continued

4-Methylphenyl 4,6-O-benzylidene-1-thio-β—D-galactopyranoside

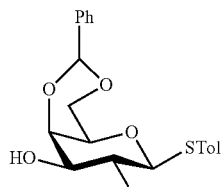

Methyl 4,6-O-benzylidene-β-D-galactopyranoside

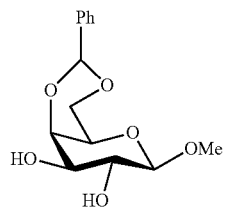

Methyl 3-O-benzyl-β-D-galactopyranoside

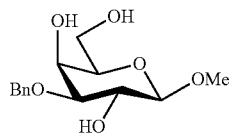

Methyl 2,4,6-tri-O-acetyl-3-O-benzyl-β-D-galactopyranoside

Methyl 4-O-(α-D-galactopyranosyl)-α-D-galactopyranoside

2-Nitrophenyl α-D-galactopyranoside and

3-Nitrophenyl α-D-galactopyranoside.

Suitable examples of galactopyranose derivatives include:

1,2:3,4-Di-O-isopropylidene-α-L-galactopyranose)

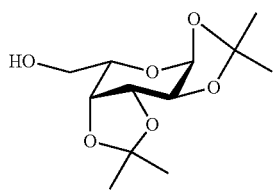

1,2:3,4-Di-O-isopropylidene-α-D-galactopyranose

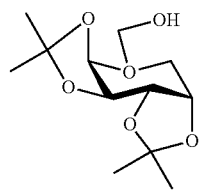

6-Deoxy-6-iodo-1,2:3,4-di-O-isopropylidene-α-D-galactopyranose

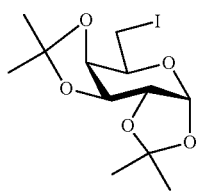

1,3,4,6,-Tetra-O-acetyl-2-azido-2-deoxy-D-galactopyranose and 1,3,4,6-Tetra-O-acetyl-2-deoxy-2-iodo-D-galactopyranose.

Suitable examples of mannopyranoside derivatives include:

Methyl 4,6-O-benzylidene-α-D-mannopyranoside

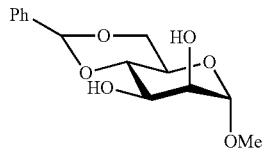

4-Amionphenyl α-D-mannopyranoside

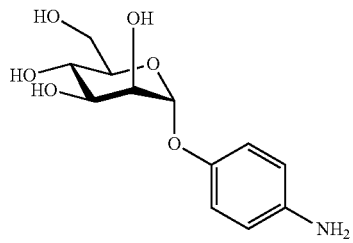

Benzyl 2,3,4-tri-O-benzyl-α-D-mannopyranoside

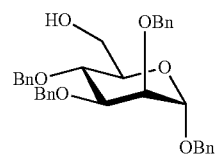

4-Nitrophenyl α-D-mannopyranoside

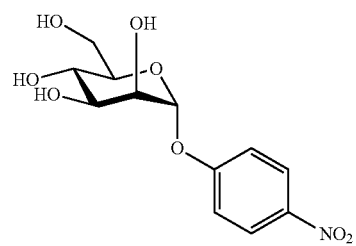

Suitable examples of mannopyranose derivatives include:

1,6:2,3-Dianhydro-β-D-mannopyranose

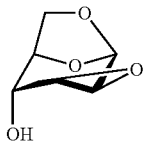

1,6:2,3-Dianhydro-4-O-(2',3',4',6-tetra-O-acetyl-β-D-glucopyranosyl)-β-D-mannopyranose

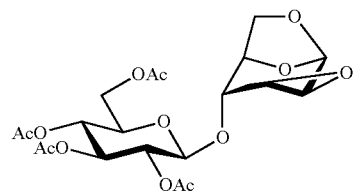

1,6:2,3-Dianhydro-4-O-(methyl 2,3-di-O-benzyl-β-D-glucopyranosyluronate)-β-D-mannopyranose

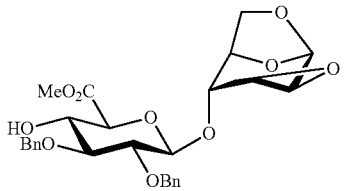

1,6:2,3-Dianhydro-4-O-(4,6-O-benzylidene-2,3-di-O-benzyl-β-D-glucopyranosyl)-β-D-mannopyranose

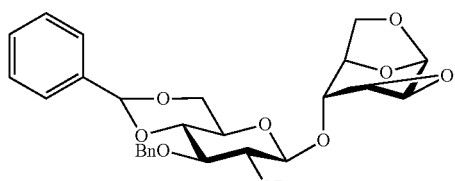

1,6:2,3-Dianhydro-4-O-(2,3-di-O-benzyl-β-D-glucopyranosyl)-β-D-mannopyranose

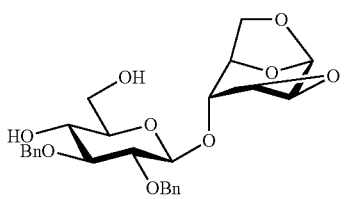

Suitable examples of mannofuranoside derivatives include:

1-O-Benzyl-2,3-O-isopropylidene-α-D-mannofuranoside

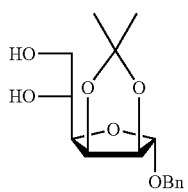

1-O-Benzyl-2,3:5,6-di-O-isopropylidene-α-D-mannofuranoside

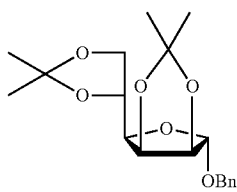

Suitable examples of mannofuranose derivatives include:

2,3:5,6-Di-O-isopropylidene-α-D-mannofuranose

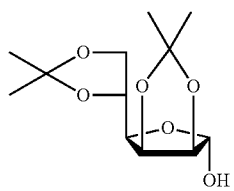

Preferably, component B) is methyl 4,6-O-nitrobenzylidene-α-D-galactopyranoside or methyl 4,6-O-benzylidene-α-D-mannopyranoside, typically having a melting point of 182-184° C. and 144-145° C., respectively.

Further Nucleating/Agent

For purpose of the invention with nucleating agent is meant any material that effectively accelerates the phase change from liquid polymer to semi-crystalline polymer (evident via faster crystallization rates measured with a differential scanning calorimeter or small crystallites observed with an optical microscope). Some nucleating agents also act as a clarifying agent and are referred as clarifying agents. They are also considered as nucleating agents.

In some embodiments, the composition may comprise a further nucleating agent in addition to component B), for example in an amount of about 0.1 parts per million (ppm) or more, of about 1 ppm or more, about 5 ppm or more, or about 10 ppm or more, or about 100 ppm or more, or about 1000 ppm or more, based on the total weight of the polymer composition. In such embodiments, the nucleating typically is present in the polymer composition in an amount of about 10,000 ppm or less, about 5,000 ppm or less, or about 2,000 ppm or less.

In other embodiments, the composition comprises little or no further nucleating agent in addition to component B). For example, the composition comprises less than 1500 ppm (parts per million as weight based on the total composition), for example less than 1000 ppm, for example less than 500 ppm, for example less than 300 ppm, for example less than 100 ppm, for example less than 10 ppm, for example less than 1 ppm, for example less than 0.1 ppm, for example less than 0.05 ppm, for example less than 0.01 ppm of a further nucleating agent.

Further, in some embodiments, the composition comprises little or no talc or pigments as further nucleating agent. For example, the composition comprises less than 1500 ppm (parts per million as weight based on the total composition), for example less than 1000 ppm, more preferably less than 1000 ppm, for example less than 500 ppm, for example less than 300 ppm, for example less than 100 ppm, for example less than 10 ppm, for example less than 1 ppm, for example less than 0.1 ppm, for example less than 0.05 ppm, for example less than 0.01 ppm of talc or pigments as further nucleating agent. Preferably, if the composition comprises talc, the talc is present in an amount normally used as a filler, i.e. the amount of talc is at least 1 wt %, e.g. 1-10 wt % or 1-5 wt % with respect to the total composition.

Examples of nucleating agents are 2,6-naphthalene dicarboxamides; aliphatic mono- and di-carboxylate salts such as calcium pimelate and calcium suberate and polyvinylcyclohexane.

Other examples of nucleating agents are nonitol based nucleating agents, preferably 1,2,3-trideoxy-4,6:5,7-bis-0-((4-propylphenyl) methylene) nonitol.

Phosphate esters suitable for use as the nucleating agent include, but are not limited to, sodium 2,2'-methylene-bis-(4,6-di-tert-butylphenyl)phosphate (from Asahi Denka Kogyo K. K., known as "NA-11 ™"), aluminum hydroxy bis[2,2'-methylene-bis-(4,6-di-tert-butylphenyl)phosphate] (from Asahi Denka Kogyo K.K., known as "NA-21 ™"), and other such phosphate esters as disclosed for example in U.S. Pat. Nos. 5,342,868 and 4,463,113.

Bicyclic dicarboxylate metal salts suitable for use as nucleating agent include, but are not limited to, those salts described in U.S. Pat. Nos. 6,465,551 and 6,534,574. The bicyclic salts having the structure shown below:

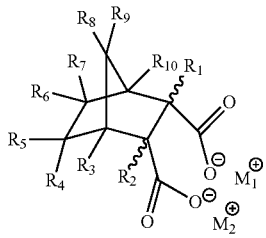

wherein $M_1$ and $M_2$ are independently selected from the group consisting of: sodium, calcium, strontium, lithium, zinc, magnesium, and monobasic aluminum; wherein $R_1$, $R_2$, $R_3$, $R_4$, $R_5$, $R_6$, $R_7$, $R_8$, $R_9$, and $R_{10}$ are independently selected from the group consisting of: hydrogen and $C_1$-$C_9$ alkyls; and further wherein any two adjacently positioned $R_3$-$R_{10}$ alkyl groups optionally may be combined to form a carbocyclic ring. In particular, suitable bicyclic dicarboxylate metal salts include disodium bicyclo[2.2.1]heptane-2,3-dicarboxylate, calcium bicyclo[2.2.1]heptane-2,3-dicarboxylate, and combinations thereof. One may employ HYPERFORM® HPN-68 or HPN-68L from Milliken & Company of Spartanburg, S.C. HPN-68L is commercially sold, and comprises the disodium bicyclo[2.2.1] heptane-2,3-dicarboxylate, as shown below:

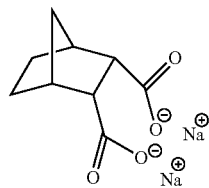 [SMILES: O=C([O-])C1C2CCC(C2)C1C(=O)[O-] ; [Na+] ; [Na+]]

Metal salts of hexahydrophthalic acid (HHPA) are known to the person skilled in the art. Such compounds may be as shown:

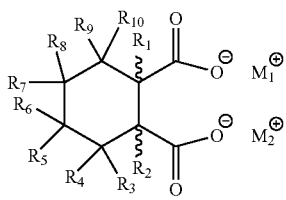

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl. In one preferred embodiment, the $M_1$ and $M_2$ are combined as a calcium ion. Ca HHPA as referred to herein refers to the following compound:

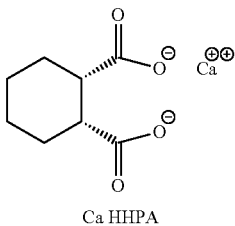 [SMILES: O=C([O-])[C@H]1CCCC[C@H]1C(=O)[O-] ; [Ca+2]]

Ca HHPA

Di-acetal derivatives, which may be used as nucleating agent include, but are not limited to, alditol acetals, such as the sorbitol di-acetals described in U.S. Pat. No. 5,049,605. Suitable di-acetal derivatives preferably conform to the formula

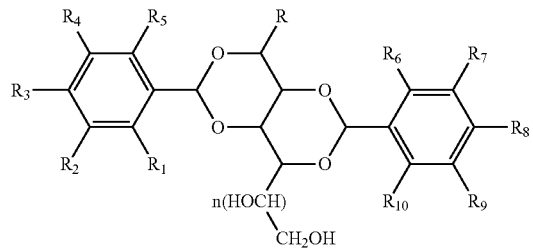

In formula (I), n typically is a value selected from 0, 1, or 2. R typically is selected from the group consisting of hydrogen, alkenyl (such as allyl), alkyl, alkoxy, hydroxyl-alkyl, alkyl-halide, aromatic and substituted aromatic groups. $R_1$, $R_2$, $R_3$, $R_4$, $R_5$, $R_6$, $R_7$, $R_8$, $R_9$, and $R_{10}$ typically are independently selected from the group consisting of hydrogen, fluorocarbons, alkenyl, alkyl, alkynyl, alkoxy, carboxy, halides, amino, thioether and aromatic groups. In certain embodiments, any two adjacent groups selected from $R_1$, $R_2$, $R_3$, $R_4$, $R_5$, $R_6$, $R_7$, $R_8$, $R_9$, and $R_{10}$ may be combined to form a cyclic group selected from the group consisting of methylenedioxy, cyclopentyl, cyclohexyl, or other similar cyclic groups. In certain embodiments, the nucleating agent preferably is 1,3:2,4-bis(3,4-dimethylbenzylidene) sorbitol (hereinafter DMDBS), available from Miliiken Chemical under the trade name Millad® 3988.

Di-, tri-, and tetra-amides suitable for use as the nucleating agent include, but are not limited to: di- and tri-amides containing amide cores comprised of either single and fused 4,5,6,7-membered aromatic or cycloaliphatic rings; di- and tri-amides containing amide cores comprised of di and tri aliphatic carboxylic acids or di and tri aliphatic amines; and tri- and tetra-amides containing amide cores comprised of aliphatic tri- and tetracarboxylic acids and aliphatic or cycloaliphatic amines. These compounds are exemplified in patent publications, including WO 2004072168, EP 0940431 and WO 200506387.

Additives

Optionally, additives may be present in the composition of the present invention. The additives may for example be added prior to or during the melt-mixing of components A) and B). Examples of suitable additives include but are not limited to the additives usually used for polyolefins, for example antioxidants, acid scavengers, processing aids, lubricants, surfactants, blowing agents, ultraviolet light absorbers, quenchers, antistatic agents, slip agents, anti-blocking agents, antifogging agents. The additives may be present in the typically effective amounts well known in the art, such as 0.001 weight % to 10 weight % based on the total composition.

Therefore, the invention also relates to a composition of the invention further comprising additives.

It will be appreciated that the amounts of the additives are adjusted so that the desired properties of the composition are still obtained. For example, if additives known to influence the clarity, such as dies and fillers such as talc, are present in the composition, the amounts should be adjusted such that the desired clarity is still obtained.

The composition of the invention may be prepared by melt-mixing component B) with component A).

Therefore, in another aspect, the invention also relates to a process for the preparation of the composition of the invention comprising the step of
melt-mixing component B) with component A) and optional additives.

Before melt-mixing, components A) and B) and the optional additives may be pre-mixed in a mixer, for example a dry blender (as may be purchased from Henschell). Components A) and B) are preferably pre-mixed or melt-mixed in the form of a powder or granules but, although less preferred may also be melt-mixed in the form of pellets.

After the melt-mixing, the composition obtained in the melt-mixing may be pelletized.

With melt-mixing is meant that components A) and B) are mixed at a temperature that exceeds the melting temperature of components A) and B). Melt-mixing may be done using techniques known to the skilled person, for example in an extruder, for example a single screw or twin screw extruder, preferably a twin screw extruder.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 150° C. in the feed zone to 300° C. at the die. Preferably, the temperature in the extruder varies from 165 to 250° C.; likewise, the screw speed of the extruder may be varied as needed. Typical screw speeds are in the range from about 100 rpm to about 400 rpm.

It has been found that the optical properties and in particular the clarity of the composition of the invention is retained as compared to a composition not containing component B). For purpose of the invention, the clarity of the composition is measured according to ASTM D1746-09. Preferably, the clarity of the composition as measured according to ASTM D1746-09 is at least 10%, for example at least 20%, for example at least 30%, for example at least 50%, for example at least 60%, for example at least 70%, for example at least 80%, for example at least 90%.

In another aspect, the invention relates to the use of the composition of the invention in injection molding, in particular to thin wall injection molding.

One application of thin wall injection molding is thin wall packaging. Thin wall packaging produced via thin wall injection molding provides an answer to the desire for a more sustainable way of packaging, since less material and energy are needed for the injection molding. Consequently, thin wall packaging produced via thin wall injection molding reduces the carbon footprint of the packaging.

Suitable applications of the composition according to the invention include cosmetic and healthcare products; polymers with embedded nucleating effect for enhanced performance; dental composites; adhesives; gel electrolytes for future energy technologies; environmental remediation (as they can gel oil from aqueous mixtures) and controlled release in drugs, controlled release of fragrance.

The most optimal conditions for (thin wall) injection molding depend on the exact composition used. In general, the temperature for injection molding will be from about 150 to about 200° C., for example in the range from about 150 to about 170° C., for example from about 155 to about 165° C. The optimal filling speed (generally less than 0.5 seconds for thin wall injection molding) and pressure with which the composition is injected into the mold, the time needed for cooling etc. can easily be determined by the person skilled in the art. For short cycle times, it is desired to keep the time that the composition is in the mold as short as possible.

The definition of thin wall is dynamic, since it depends upon the application for which it is used.

Within the framework of this invention with 'thin wall' is meant a wall thickness in the range from 0.5 to 3.5, preferably 0.5 to 2 mm.

Examples of thin wall packaging items include but are not limited to: food packaging items, such as tubs, trays, jars, containers, lids, plates and cups.

Since the compositions of the invention may have a high heat distortion temperature as well as a low brittleness around freezing temperature, articles produced from said composition can be used at high as well as at lower temperatures.

Application areas where use at both higher and lower temperatures are desired are for example food applications, for example microwaveable, freezer-safe and ovenable containers and medical applications, where sterilization is needed prior to the filling of a container, but the medication inside the container needs to be stored at a low temperature (e.g. from 4 to 7° C.).

In another aspect, the invention relates to articles comprising the composition of the invention, wherein the article is prepared by injection molding, preferably thin wall injection molding. Preferably, the article is in medical or food grade applications.

In yet another aspect, the invention relates to a process comprising the step of injecting the composition of the invention in a mold, preferably a thin wall mold, wherein a thin wall mold is a mold providing a space having a wall thickness in the range from 0.5 to 2 mm.

Examples of thin wall injection molded objects include but are not limited to (food) packaging, cellular phone components, laptop/notebook computer components, hand held devices and medical devices, document cases, storage containers, pen barrels and packaging for textiles, for example for dry goods, socks, handkerchiefs, underwear etc.

The invention further relates to use of component B) as a nucleating agent in a composition comprising A) polyolefin. Preferably, the amount of component B) is from 0.25 to 5 wt % based on the total composition.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXPERIMENTS

Experiments 1-7

500 g of propylene random copolymer was dry blended with 500 ppm of Irganox 3114, 500 ppm of Irgafos 168, 700 ppm of Calcium stearate and nucleating agents as summarized in Table 1 and 2 in a high speed ribbon mixer at 100 rpm and extruded in Haake rheomeix twin screw extruder. The barrel temperature was as follows T1-190, T2-190, T3-85, T4-180 and T5-180

The extrudate was cooled, pelletized, and dried for overnight at 80° C.

The amounts of the additives are with respect to the amount of the polypropylene random copolymer.

DSC

The determination of melting temperature and crystallization temperature was carried out by means of DSC (differential scanning calorimeter). The measurement was carried out in accordance with ASTM D3417-97/D3418-97, using a first heating step at a heating rate of 10 per minute up to 180° C., a dynamic crystallization at a cooling rate of 10° C. per minute down to 25° C. and second heating rate of 10° C. per minute back up to 200° C. The melting temperature and crystallization temperature were determined using the second heating cycle. Results are summarized in Table 1.

TABLE 2-continued

| | |
|---|---|
| com N.A. 4 | Potassium benzoate |
| com N.A. 5 | Potassium nicotinate |

Random PP1 is a polypropylene-ethylene random copolymer having an MFI of 12 g/10 min according to ISO1133, 2.16 kg at 230° C. (unstabilized, from Saudi Kayan, KSA). The amount of ethylene comonomer was 5-10 mol % and the amount of propylene comonomer was 95-90 mol %.

For reference, Ex 8-11 are added in Tables 1 and 2 in order to show the nucleating efficiency of various nucleating agents in polypropylene (made from Table 2 of U.S. Pat. No. 8,785,529B2). In Ex 8-11, the following steps were followed:

Random PP2=Polypropylene random copolymer (PRCP, unstabilized, 400 g, MI-12 from M/s Reliance Industries Limited, Hazira, Gujarat, India) was dry blended with 0.20 g of Irganox 1010, 0.32 g, 0.08 g Hydrotalcite DHT 4A, 0.16 g Glycerol Monostearate (Finstate 9500), 0.20 g calcium stearate and 0.80 g of nucleating agent in a high speed ribbon mixer at 80 RPM and extruded in single screw extruder of Brabender Plasticorder with a temperature profile of 170-200-230-225° C. and 60 RPM. The extrudates were cooled, pelletized and dried for 2 h at 80° C. and molded.

In Table 1, Tc-TcRef indicates the difference in the crystallization temperatures between the composition comprising the nucleating agent and the corresponding composition without the nucleating agent.

It can be understood that the nucleating agent used according to the invention (N.A. 1) shows a very large increase in Tc which is almost as large as the nonitol based nucleating agents (com N.A. 1 and 2). The increase by the use of the nucleating agent according to the invention is larger than all other non-nonitol based nucleating agents (com N.A 3-5).

Nucleating agents have a certain threshold for effecting nucleation. For N.A. 1, it can be seen that the threshold is between 0.2-0.3 wt %. At a certain amount of loading of nucleating agents, a plateau value is reached for the Tc, i.e. after the plateau value is reached, the increase in the loading amount no longer increases Tc. For N.A. 1, an increase in Tc is still observed from the loading of 0.3 wt % to 0.5 wt %.

TABLE 1

| Ex | Polypropylene | nucleating agent | Tm (° C.) | Tc (° C.) | Tm − Tc (° C.) | Tc − TcRef (° C.) |
|---|---|---|---|---|---|---|
| 1 | Random PP 1 | none | 148.5 | 106 | 42.5 | 0 |
| 2 | Random PP 1 | 0.1 wt % of N.A. 1 | 148.5 | 106 | 42.5 | 0 |
| 3 | Random PP 1 | 0.2 wt % of N.A. 1 | 148.5 | 106 | 42.5 | 0 |
| 4 | Random PP 1 | 0.3 wt % of N.A. 1 | 148.5 | 115 | 33.5 | 9 |
| 5 | Random PP 1 | 0.5 wt % of N.A. 1 | 148.5 | 117 | 31.5 | 11 |
| 6 | Random PP 1 | 0.2 wt % of com N.A. 1 | 148.5 | 119 | 29.5 | 13 |
| 7 | Random PP 1 | 0.2 wt % of com N.A. 2 | 148.5 | 119 | 29.5 | 13 |
| 8 | Random PP 2 | none | 149 | 109 | 40 | 0 |
| 9 | Random PP 2 | 0.2 wt % of com N.A. 3 | 149 | 115 | 34 | 6 |
| 10 | Random PP 2 | 0.2 wt % of com N.A. 4 | 149 | 114 | 35 | 5 |
| 11 | Random PP 2 | 0.2 wt % of com N.A. 5 | 150 | 112 | 38 | 3 |

TABLE 2

| | |
|---|---|
| N.A. 1 | methyl 4,6-O-(4-nitrobenzylidene)-α-D-galactopyranoside |
| com N.A. 1 | nonitol based nucleating agents (NX 8000 from Milliken) |
| com N.A. 2 | nonitol based nucleating agents (NX 8500E from Milliken) |
| com N.A. 3 | Sodium benzoate |

N.A. 1 can therefore lead to an even larger increase by increasing the amount from 0.5 wt %. For com N.A. 1-2, the plateau value is already reached at 0.2 wt %.

Conventional inorganic nucleating agents can achieve a large increase of Tc as observed with N.A. 1 only if loaded more than 1-2 wt %. At such loading, a relatively large decrease in the transparency is observed. For the composition comprising N.A. 1, the transparency did not change at a loading of 0.5 wt %.

It can therefore be understood that the composition according to the invention has a significantly increased Tc and hence shorter cycle times for the preparation of articles can be achieved. This can advantageously be achieved without compromising on the clarity.

The invention claimed is:

1. A composition comprising
   A) a polyolefin and
   B) one or more compounds selected from the group of methyl 4, 6-O-benzylidene-α-D-mannopyranoside, 4-aminophenyl α-D-mannopyranoside, benzyl, 2,3,4-tri-O-benzyl-α-D-mannopyranoside and 4-nitrophenyl α-D-mannopyranoside, 1,6:2,3-dianhydro-β-D-mannopyranose, 1,6:2,3-dianhydro-4-O-(2',3',4',6'-tetra-O-acetyl-β-D-glucopyranosyl)-β-D-mannopyranose, 1,6:2,3-dianhydro-4-O-(methyl 2,3-di-O-benzyl-β-D-glucopyranosyluronate)-βD-mannopyranose, 1,6:2,3-dianhydro-4-O-(4,6-O-benzylidene-2,3-di-O-benzyl-β-D-glucopyranosyl)-β-D-mannopyranose, 1,6:2,3-dianhydro-4-O-(2,3-di-O-benzyl-β-D-glucopyranosyl)-β-D-mannopyranose, mannofuranoside derivatives and/or mannofuranose derivatives,
   wherein the amount of component B) is from 0.25 to 5 wt % based on the total wt % of the composition.

2. The composition according to claim 1, wherein A) is an ethylene-based polymer and/or a propylene-based polymer.

3. The composition according to claim 1, wherein A) is a propylene-based polymer.

4. The composition according to claim 1, wherein A) is selected from the group consisting of a propylene homopolymer, a random or a block copolymer of at least 70 wt % of propylene with up to 30 wt % of an α-olefin having 2 or 4 to 10 C-atoms or a heterophasic propylene copolymer consisting of (a) a propylene-based matrix,
   wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and
   wherein the propylene-based matrix is present in an amount of 60 to 95 wt % based on the total heterophasic propylene copolymer and
   (b) a dispersed ethylene-α-olefin copolymer,
   wherein the dispersed ethylene-α-olefin copolymer is present in an amount of 40 to 5 wt % based on the total heterophasic propylene copolymer and
   wherein the sum of the total amount of propylene-based matrix and total amount of the dispersed ethylene-α-olefin copolymer in the heterophasic propylene copolymer is 100 wt %.

5. A composition comprising
   A) a polyolefin and
   B) one or more compounds selected from the group of galactopyranoside derivatives, galactopyranose derivatives, mannopyranoside derivatives, mannopyranose derivatives, mannofuranoside derivatives and/or mannofuranose derivatives,
   wherein the amount of component B) is from 0.25 to 5 wt % based on the total wt % of the composition, and
   wherein B) is selected from
   methyl 4,6-O-(4 nitrobenzylidene)-α-D-galactopyranoside,
   2-chloro-4-nitrophenyl 2-azido-2-deoxy-β-D-galactopyranoside,
   2-fluoro-4-nitrophenyl 2-azido-2-deoxy-β-D-galactopyranoside,
   4-methoxyphenyl 2,3,4,6-tetra-O-acetyl-β-D-galactopyranoside,
   4-methylphenyl 4,6-O-benzylidene-1-thio-β-D-galactopyranoside,
   methyl 4,6-O-benzylidene-β-D-galactopyranoside,
   methyl 3-O-benzyl-β-D-galactopyranoside,
   methyl 2,4,6-tri-O-acetyl-3-O-benzyl-β-D-galactopyranoside,
   methyl 4-O-(α-D-galactopyranosyl)-α-D-galactopyranoside,
   2-nitrophenyl α-D-galactopyranoside and
   3-nitrophenyl α-D-galactopyranoside;
   1,2:3,4-di-O-isopropylidene-α-L-galactopyranose,
   1,2:3,4-di-O-isopropylidene-α-D-galactopyranose,
   6-deoxy-6-iodo-1,2:3,4-di-O-isopropylidene-α-D-galactopyranose,
   1,3,4,6-tetra-O-acetyl-2-azido-2-deoxy-D-galactopyranose and
   1,3,4,6-tetra-O-acetyl-2-deoxy-2-iodo-D-galactopyranose;
   methyl 4, 6-O-benzylidene-α-D-mannopyranoside,
   4-aminophenyl α-D-mannopyranoside,
   benzyl 2,3,4-tri-O-benzyl-α-D-mannopyranoside and
   4-nitrophenyl α-D-mannopyranoside;
   1,6:2,3-dianhydro-3-D-mannopyranose,
   1,6:2,3-dianhydro-4-O-(2',3',4',6'-tetra-O-acetyl-β-D-glucopyranosyl)-β-D-mannopyranose,
   1,6:2,3-dianhydro-4-O-(methyl 2,3-di-O-benzyl-β-D-glucopyranosyluronate)-β-D-mannopyranose,
   1,6:2,3-dianhydro-4-O-(4,6-O-benzylidene-2,3-di-O-benzyl-β-D-glucopyranosyl)-β-D-mannopyranose and
   1,6:2,3-dianhydro-4-O-(2,3-di-O-benzyl-β-D-glucopyranosyl)-β-D-mannopyranose;
   1-O-benzyl-2,3-O-isopropylidene-α-D-mannofuranoside and
   1-O-benzyl-2,3:5,6-di-O-isopropylidene-α-D-mannofuranoside; and
   2,3:5,6-di-O-isopropylidene-α-D-mannofuranose.

6. The composition according to claim 1, wherein B) is methyl 4,6-O-benzylidene-α-D-mannopyranoside.

7. The composition according to claim 1, wherein the amount of component B) is from 0.35 to 0.75 wt % based on the total wt % of the composition.

8. The composition according to claim 1, wherein the clarity of the composition as measured according to ASTM D1746-09 is at least 30%.

9. An Article comprising the composition of claim 1, wherein the article is prepared by injection molding.

10. The Article of claim 9, wherein the article is in medical or food grade applications.

11. A Process comprising the step of injecting the composition of claim 1 in a mold to form a product.

12. The process of claim 11, wherein the mold is a mold providing a space having a wall thickness in the range from 0.5 to 2 mm.

13. An Process for the preparation of the composition of claim 1 comprising the step of
   melt-mixing components A) and B) and optional additives.

14. The composition according to claim 1, wherein B) comprises a mannopyranose derivative.

15. The composition according to claim 1, wherein B) comprises a mannofuranoside derivative.

16. The composition according to claim 1, wherein B) comprises a mannofuranose derivative.

17. The composition according to claim 7, wherein the amount of component B) is from 0.45 to 0.75 wt % based on the total wt % of the composition.

* * * * *